United States Patent
Bochen et al.

(10) Patent No.: US 7,992,460 B2
(45) Date of Patent: Aug. 9, 2011

(54) DRIVE DEVICE

(75) Inventors: Marian Bochen, Eitelborn (DE); Rolf Mintgen, Thuer (DE); Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 1002 days.

(21) Appl. No.: 11/900,071

(22) Filed: Sep. 10, 2007

(65) Prior Publication Data

US 2008/0060463 A1 Mar. 13, 2008

(30) Foreign Application Priority Data

Sep. 9, 2006 (DE) .......... 10 2006 042 460
Aug. 23, 2007 (DE) .......... 10 2007 039 823

(51) Int. Cl.
*F16H 25/20* (2006.01)
*B62D 25/12* (2006.01)
(52) U.S. Cl. .................. 74/424.76; 74/89.23
(58) Field of Classification Search ............... 74/89.23, 74/424.76
See application file for complete search history.

(56) References Cited

U.S. PATENT DOCUMENTS

| | | | | |
|---|---|---|---|---|
| 1,139,901 A | * | 5/1915 | Pitts ........................ | 187/320 |
| 4,395,924 A | * | 8/1983 | Callahan .................. | 74/424.74 |
| 4,934,203 A | * | 6/1990 | Bailey et al. ............. | 74/89.35 |
| 5,187,993 A | * | 2/1993 | Nicholson et al. ........ | 74/89.38 |
| 5,346,045 A | | 9/1994 | Bennett et al. | |
| 6,516,567 B1 | * | 2/2003 | Stone et al. .............. | 49/343 |
| 2007/0175099 A1 | | 8/2007 | Kachouh | |
| 2008/0250720 A1 | * | 10/2008 | Oxley et al. ............. | 49/358 |

FOREIGN PATENT DOCUMENTS

| | | |
|---|---|---|
| DE | 712 125 | 10/1941 |
| DE | 715 238 | 12/1941 |
| DE | 922 095 | 1/1955 |
| DE | 76 38 512 | 5/1977 |
| DE | 693 05 367 | 2/1997 |
| DE | 10 2004 040 170 | 3/2006 |
| DE | 20 2005 003 466 U1 | 7/2006 |
| DE | 20 2005 007 154 | 9/2006 |
| DE | 20 2005 007 155 | 9/2006 |
| DE | 10 2005 030 052 | 12/2006 |
| DE | 2005 020 087 | 5/2007 |
| EP | 1 420 504 | 5/2004 |

* cited by examiner

*Primary Examiner* — William C Joyce
(74) *Attorney, Agent, or Firm* — Cohen Pontani Lieberman & Pavane LLP

(57) ABSTRACT

A drive device for a hatch of a motor vehicle, wherein a spindle drive is provided with a threaded spindle and a spindle nut mounted on the threaded spindle, by which drive the first fastening element and the housing tube can be driven axially relative to each other. The spindle drive can be rotatably driven by an electric motor. The threaded spindle has a thread with a lead that changes over the length of the threaded spindle.

32 Claims, 3 Drawing Sheets

DRIVE DEVICE

BACKGROUND OF THE INVENTION

1. Field of the Invention

The present invention generally relates to the field of door openers and, more particularly, to a drive device for a hatch of a motor vehicle.

2. Description of the Related Art

Conventional drive devices for the hatch of a motor vehicle typically include a first fastening element that can be connected to a stationary component or to a movable component and a housing tube that is located at an end of the drive device opposite to the first fastening element. The housing tube is able to move axially relative to the first fastening element and has a second fastening element on the end opposite the first fastening element, where it is possible to connect this second element to the movable component or to the stationary component.

The drive device also includes a spindle drive that comprises a threaded spindle and a spindle nut that is mounted on the threaded spindle. The spindle drive permits the first fastening element and the housing tube to be driven axially relative to each other. In addition, the spindle drive can be rotatably driven by an electric motor, where the output shaft of the motor can rotate the threaded spindle or a connecting component of a clutch.

In such conventional drive devices, it is known that the threaded spindle can be designed with a thread which has the same lead over the entire length of the spindle. As a result, the shifting device exerts the same shifting force over the entire shifting stroke.

It is therefore apparent there is need for a drive device of the above-indicated type which can produce different shifting forces over the enter course of the shifting stroke in a simple manner.

SUMMARY OF THE INVENTION

The foregoing and other objects and advantages are achieved in the present invention by a drive device in which the threaded spindle has a thread with a lead that changes over the length of the threaded spindle.

As a result of such a configuration, a different shifting force can be exerted by the drive device depending on the lead of the thread of the threaded spindle. Assuming that the drive power of the rotary drive remains the same, a small lead leads to a high shifting force, whereas a large lead of the thread of the threaded spindle leads to a lower shifting force and to a higher shifting speed. Moreover, it becomes possible to use a rotary drive with a lower power rating and, thus, to also use a smaller sized drive.

In accordance with the invention, the lead of the thread can change continuously or section-by-section. To prevent the spindle nut from becoming jammed in the thread of the threaded spindle as the lead changes, the spindle nut can engage in the thread of the threaded spindle with radial linear contact. For this purpose, the spindle nut can easily be provided with a nut pin, which forms the thread of the spindle nut and which engages radially in the thread of the threaded spindle. In an embodiment, the threaded spindle is provided with a multiple-start thread. As a result, a device that is operated easily and with good efficiency is achieved.

In the preferred embodiment, the spindle nut is provided with a nut pin to engage with each flight so that jamming can be easily avoided. Here, one nut pin is mounted permanently on the spindle nut and the other nut pins are stationary in the circumferential direction but freely movable on the spindle nut in the axial direction. This freedom of movement can be obtained by arranging the additional nut pins in axial slots in the spindle nut, in which they are free to move in the axial direction.

In an alternative embodiment of the drive device, the spindle nut is provided with a nut pin to engage with each flight, where one nut pin is mounted permanently on the spindle nut and the other nut pins are stationary in the axial direction but free to move on the spindle nut in the circumferential direction. This freedom of movement can be obtained by arranging the additional nut pins in radial slots in the spindle nut, in which they are free to move in the circumferential direction.

In another embodiment, the spindle nut has a nut pin to engage with each flight, where one of the nut pins is permanently attached to the spindle nut, and the other nut pins are free move on the spindle nut in both the circumferential and axial directions. This freedom of movement can be obtained by arranging the additional nut pins in slanted slots in the spindle nut, in which they are free to move in both the circumferential and the axial directions.

The threaded spindle can be supported rotatably at one end on the housing tube, whereas it is held stationary in the axial direction with respect to the housing tube and can be rotatably driven by the electric motor; the spindle nut connected to the first fastening element can be locked against rotation with respect to the housing tube. As a result, the torque of the spindle nut is absorbed within the drive device and does not have to be supported via the fastening elements on the movable component and the stationary component.

Such a configuration makes it possible to mount the drive device in any desired orientation on the movable component and the stationary component. As a result, it becomes considerably easier to install the drive device.

The housing tube can be manufactured simply and easily by deep-drawing a metal part, for example, or by injection-molding a part out of plastic. In addition, the spindle nut can be easily connected to one end of a spindle tube coaxially surrounding the threaded spindle, where the first fastening element is permanently connected to the other end of the spindle tube. Moreover, the spindle tube can also be a metal part produced by a forming method such as deep-drawing, or it can be a plastic part produced by injection-molding.

In the preferred embodiment, the rotary drive is an electric motor, where the output shaft of the motor can rotate the threaded spindle or a clutch component.

In other embodiments of the drive device, it is possible to install a gearbox between the electric motor and the spindle drive to reduce the rotational speed and thus to increase the torque.

If the spindle drive can be rotatable driven by the rotary drive acting through a flexible shaft, then the rotary drive can also be located in a position other than that of the spindle drive. A compact design, however, can be obtained by locating the rotary drive and/or the gearbox permanently in the housing tube.

If the gearbox consists of a cylindrical gear system and/or a planetary gear set, very little noise will be generated, and this can be reduced even more if the stages of the gearbox near the rotary drive are configured as helical gear stages.

If one or both of the fastening elements are configured as the ball heads or as the spherical sockets of ball joints, an embodiment is obtained which can be easily mounted in any desired rotational position with respect to the longitudinal axis of the drive device.

If the first fastening element is actuated or actuatable by the force of a spring in the outward-travel direction, away from the housing tube, then the force of the drive device can be supported and, thus, the weight of the hatch can be balanced, and the dimensions of the rotary drive can also be decreased.

In accordance with the contemplated embodiments of the drive device, the first fastening element is actuated to obtain the adjustment by a compression spring, in particular a helical compression spring, which is supported on the housing tube. Alternatively or in addition, the first fastening element can also be actuated by gas pressure.

The force which is required to move the spindle manually is preferably selected precisely so that the hatch can be held in intermediate positions when the rotary drive is turned off or deactivated. Thus, in the case of a rotary drive in the form of an electric motor, a current-less stop position can be easily achieved.

In an embodiment of the drive device, the stroke position of the spindle tube is detected by a stroke detection sensor. Here, the sensor provides output signals that can be used, in particular, for the synchronization of two drive devices on the hatch which operate in parallel. In addition, it is also possible to determine the travel position, i.e., distance, produced by the drive device based on this output signal.

In an embodiment of the drive device, which occupies only a small amount of space, the stroke detection sensor is a linear potentiometer, where the wiper of stroke detection sensor is permanently connected to the spindle tube or the housing tube of the drive device, and where the wiper track is permanently connected to the housing tube or the spindle tube. It should be understood that in embodiments where the wiper is on the spindle tube, then the wiper is on the housing tube. Alternatively, when the wiper is on the housing tube, then the wiper track is on the spindle tube. In other embodiments, the revolutions of the spindle are determined by a spindle sensor to determine the traveling speed, the travel position and the synchronization of parallel drive devices.

To disconnect the electric motor from the spindle drive, the electric motor that rotatably drives the spindle drive can be actuated by a releasable clutch, which can be a positive clutch or a friction clutch.

In alternative embodiments, the clutch is provided with an engaging and disengaging function so that the clutch can be opened and closed. In particular, the clutch engages and disengages magnetically.

In other embodiments of the drive device, a separate clutch drive is omitted. Here, the clutch is configured such that it is open when the drive device is in the no-load state or is loaded in the outward-travel direction and is closed by exerting force on the drive device in the inward-travel direction. As a result, the hatch is allowed to be moved by hand with the exertion of only modest manual forces in the pulling direction of the drive device, because the electric motor and possibly the gearbox cannot exert any inhibiting forces on the spindle. In accordance with the contemplated embodiment, it becomes possible to detect obstacles and to eliminate them in an optimal manner when the hatch is being closed because no tractive forces can be transmitted.

The means for balancing the weight of the hatch are preferably configured such that a resultant moment is always acting in the closing direction. Consequently, the drive device is required to always be able to open the hatch in a motorized manner. It thus becomes necessary only to let it down at a defined speed to close the hatch.

In yet another embodiment, a guide tube which surrounds the spindle tube, thus forming a predefined gap, can be mounted in the housing tube. Here, if the helical compression spring surrounds the guide tube, while leaving a predefined gap, and is also surrounded by a jacket tube connected to the first fastening element, at another predefined gap, then the helical compression spring is both guided and protected radially both toward the outside and toward the inside.

In each contemplated embodiment of the invention, it is possible to protect the components of the drive device from dirt and damage by configuring the housing tube and the jacket tube so that they can telescope into and out of each other.

In other contemplated embodiments, the guide tube is provided with an axial slot, which passes completely through in the radial direction, through which the wiper permanently connected to the spindle tube projects to the wiper track permanently mounted on the guide tube, and/or through which a radially oriented support pin of the spindle nut projects. As a result, the torque of the spindle nut becomes easily absorbed.

In another embodiment of the drive device, a slender configuration is obtained by arranging the rotary drive, the gearbox, the clutch and/or the spindle drive in series, i.e., in a row, with respect to each other.

Alternatively, a not so slender but slender shorter configuration is obtained by arranging the rotary drive, the gearbox, the clutch and/or the spindle drive in parallel to each other.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The various features, functions and advantages characterizing the invention will be better understood by reference to the detailed description which follows, taken in conjunction with the accompanying drawings. It should be understood that the drawings are not necessarily drawn to scale and that, unless otherwise indicated, they are merely intended to conceptually illustrate the structures and procedures described herein. In the drawings, wherein like reference characters denote similar elements throughout the several views.

DETAILED DESCRIPTION OF THE PRESENTLY PREFERRED EMBODIMENTS

Figure 1:
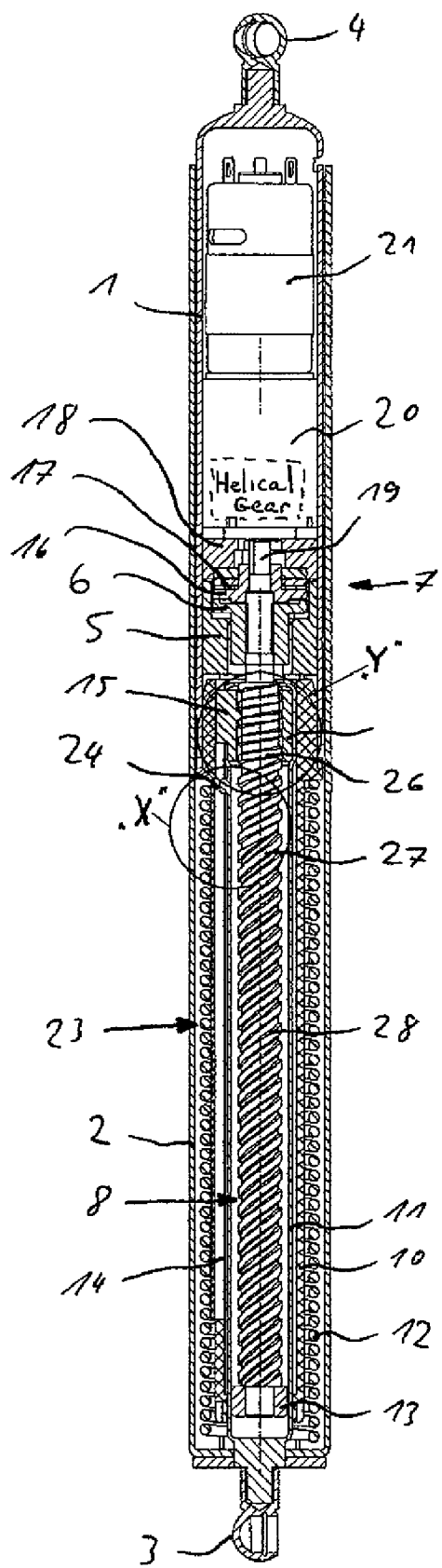
FIG. 1 shows a cross section through a drive device in accordance with the invention.
Figure 2:
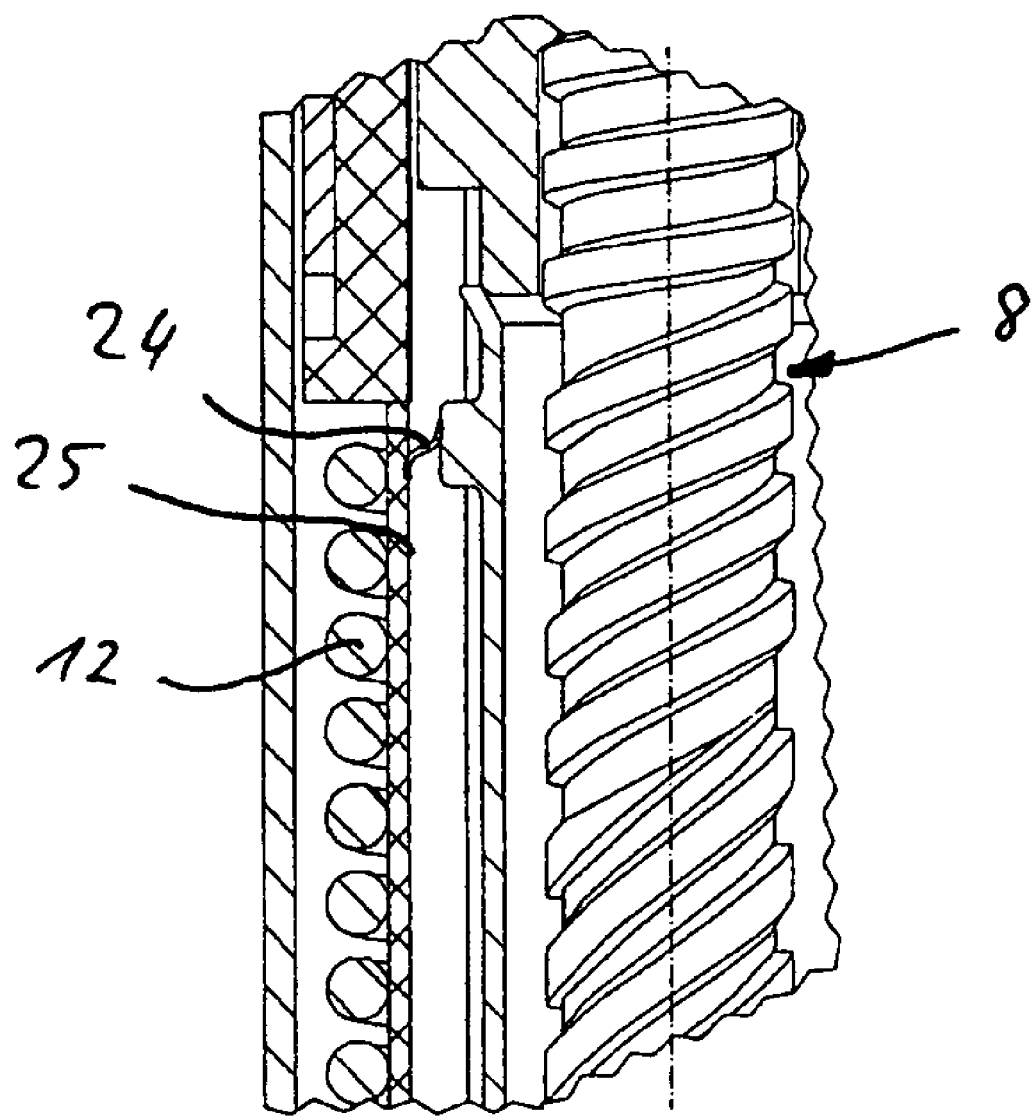
FIG. 2 shows an enlarged view of an area of the drive device identified by the reference character "X" in FIG. 1.

With respect to FIGS. 1-4, the drive device shown therein includes a housing tube 1, on which a jacket tube 2 is guided in a telescoping manner.

A first ball socket 3 is provided on an end of the jacket tube 2 opposite the housing tube 1, and a second ball socket 4 is provided on the end of the housing tube 1 opposite the jacket tube 2. These sockets 2, 4 make it possible to hinge the drive device to a stationary body component of a motor vehicle and to a movable component of the motor vehicle, such as a hatch of the vehicle.

A first bearing part 5 is permanently inserted in the end area of the housing tube 1 facing the jacket tube 2, in which a first clutch part 6 of a friction clutch 7 is rotatably supported. The clutch part is seated firmly on one end of a threaded spindle 8 projecting into the jacket tube 2.

A spindle nut 9 is threaded onto the threaded spindle 8 but is mounted non-rotatably with respect to the housing tube 1, i.e., the threaded spindle is unable to rotate with respect to the housing tube 1. The spindle nut 9 is connected to one end of a spindle tube 11, which coaxially surrounds the threaded spindle 8. The first ball socket 3 is permanently mounted on the other end of the spindle tube. Here, the spindle nut 9 is guided with a relative degree of freedom to slide axially in a guide tube 10 surrounding the spindle tube 11, where the guide tube is permanently connected to the housing tube 1.

A helical compression spring 12 is provided in the annular gap between the guide tube 10 and the jacket tube 2 surrounding it with a predefined gap. One end of the helical compression spring 12 is supported on the jacket tube 2 in the area of the first ball socket 3, the other end being supported on the housing tube 1.

At the end facing away from the first clutch part 6, the threaded spindle 8 carries a guide sleeve 13. Here, the cylindrical lateral surface of this sleeve guides the threaded spindle 8 with a freedom of axial movement in the spindle tube 11.

The guide tube 10 includes axial slots 14, which are distributed uniformly around the circumference of the tube and which extend over almost all or substantially its entire length. In the preferred embodiment, the guide tube has three axial slots.

Radially projecting support pins 15, which correspond to the axial slots 14, are arranged on the spindle nut 9. These pins project into the axial slots 14 and, thus, prevent the spindle nut 9 from turning with respect to the guide tube 10.

A second clutch part 16 is installed in the housing tube 1 at a position coaxially opposite the first clutch part 6. In certain embodiments, a ring-shaped friction lining is provided between the two clutch parts 6 and 16.

The side of the second clutch part 16 facing away from the first clutch part 6 is supported axially by an axial bearing 17 on an abutment part 18, which is permanently mounted in the housing tube 1.

In accordance with contemplated embodiments of the invention, the first clutch part 6 and the second clutch part 16 have a certain amount of play between them, so that they can move axially away from each other to break the frictional connection between them.

A takeoff shaft 19 of a gearbox 20 is connected coaxially and non-rotatably to the second clutch part 16, where the gearbox 20 is rotatably driveable by an electric motor 21. In the preferred embodiment, the gearbox a multi-stage gearbox. The gearbox 20 and the electric motor 21 are arranged coaxially with respect to the clutch 7 in the housing tube 1.

In accordance with the exemplary embodiments, a stroke detection sensor 23 is provided. In the preferred embodiments, the stroke detection sensor is a linear potentiometer. For this purpose, a wiper 24 is mounted on the spindle tube 11, at a location near to the spindle nut 9. Here, the wiper projects through one of the axial slots 14 and is moveable by the spindle nut 9 and the spindle tube 11 along a wiper track 25, which extends opposite the outer side of the axial slot 14.

The threaded spindle 8 has a three-flight thread. As shown in FIG. 1, the thread has three sections 26, 27, 28 extending over the length of the threaded spindle, each with a different lead. The first section 26, i.e., the section nearest the clutch, has a thread with a small lead. Adjacent to this first section 26 is the second section 27, the lead of which is larger than that of the first section 26, whereas adjacent to that and extending over most of the length of the threaded spindle 8 is the third section 28, the thread of which has the largest lead.

Figure 3:
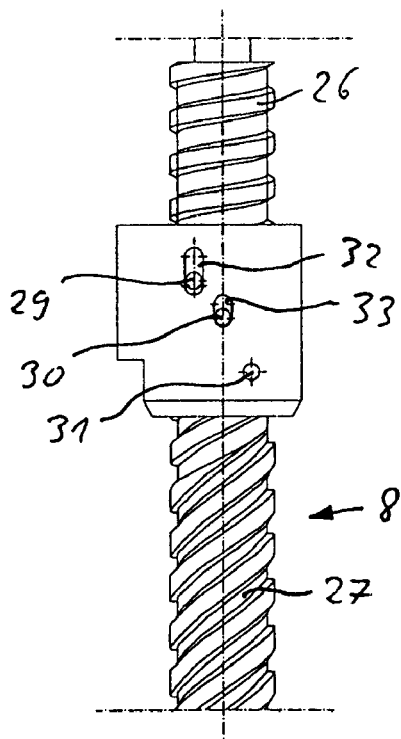
FIG. 3 shows an enlarged view of an area of the drive device identified by the reference character "Y" in FIG. 1.

With additional reference to FIG. 3, the spindle nut 9 is provided with three nut pins 29, 30, 31, one for each of the three flights of the threaded spindle 8; these pins project inward into the associated flights. The three nut pins 29, 30, 31 shown in FIG. 3 are stationary in the circumferential direction and are arranged on the spindle nut 9 with an offset in the axial direction. The first nut pin 29 and the second nut pin 30 are arranged with freedom of axial movement in the axial slots 32, 33 in the spindle nut 9. As a result, it is always possible for these two nut pins 29 and 30 to adjust their axial positions in correspondence with the lead of the section, i.e., section 26, 27, or 28 of the thread in which they happen to be engaged at the time. As a result, the rotational force can be converted very effectively into a translational force. Lastly, the third nut pin 31 is mounted permanently on the spindle nut 9 so that it cannot move in either the circumferential or in the axial direction. The tilting moment acting on the spindle nut 9 is absorbed by the spindle tube 11, which is guided in the housing tube 1.

Figure 4:
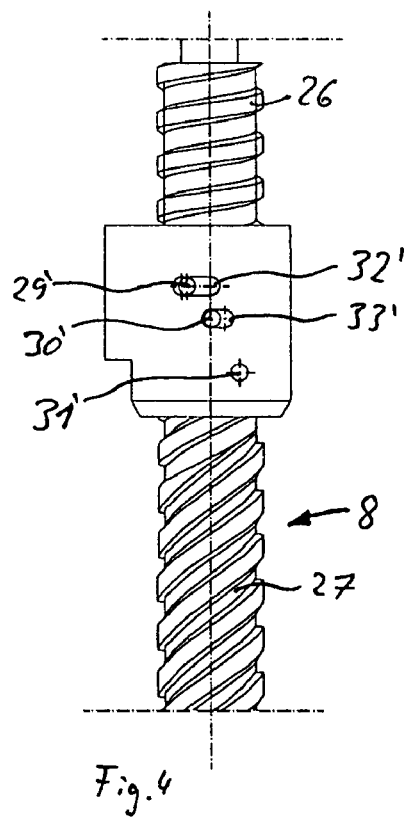
FIGS. 4 and 5 each show an additional embodiment of the component illustrated in FIG. 3.

FIG. 4 shows an alternative embodiment of the spindle nut 9 of FIG. 3. In the present contemplated embodiment, however, the movably mounted nut pins is moveable in the radial direction. With reference to FIG. 4, the first nut pin 29' and the second nut pin 30' are each arranged with freedom of radial movement in a radial slot 32', 33' in the spindle nut 9. As a result, it is always possible for nut pins 29' and 30' to adjust their radial positions to accommodate the lead of the section the thread, i.e., section 26, 27 or 28, in which they are engaged with at the time. As a result, the supporting load exerted by the weight of the hatch can be effectively absorbed. Similarly, the third nut pin 31' is again mounted on the spindle nut with no freedom of movement in either direction.

Figure 5:
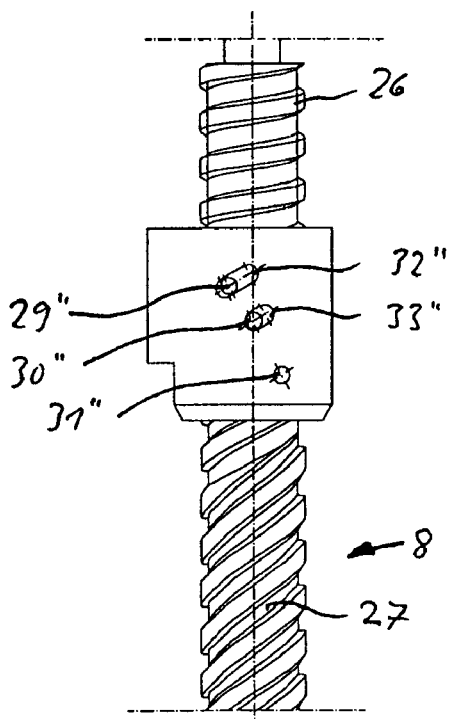

FIG. 5 shows another alternative embodiment of the spindle nut 9 of FIG. 3 In the present contemplated embodiment, however, the movably mounted nut pins 29", 30" are moveable in both the radial and the circumferential direction. The first nut pin 29" and the second nut pin 30" are each arranged in a slot 32", 33" in the spindle nut 9 such that they are always able to adjust their axial and radial positions to accommodate the lead of the section, i.e., section 26, 27 or 28 of the thread in which they are engaged with at the time. The third nut pin 31", however, is again mounted on the spindle nut with no freedom of movement in either direction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive device for a hatch of a motor vehicle, comprising:
    a first fastening element, which is connectable to one of a stationary component and a movable component;

a housing tube of conductive material, said housing tube being located at an end of the device opposite the first fastening element and axially moveable relative to the first fastening element, said housing including a second fastening element located at an end opposite to the first fastening element, said second element being connectable to the other one of the movable component and the stationary component;

a spindle drive comprising a threaded spindle having a thread with a lead which changes over a length of the spindle and a spindle nut mounted on the threaded spindle, the spindle nut is provided with a nut pin to engage in each flight, one nut pin being permanently attached to the spindle nut, and other nut pins being stationary in a circumferential direction and free to move in the spindle nut in an axial direction; and a rotary drive, said spindle drive being actuatable to axially move the first fastening element relative to the housing tube and being rotatably driveable by the rotary drive.

2. The drive device according to claim 1, wherein the spindle nut engages in the thread of the threaded spindle with radial linear contact.

3. The drive device according to claim 2, wherein the spindle nut includes a plurality of nut pins, each of said plural nut pins engaging radially in the thread of the threaded spindle.

4. The drive device according to claim 1, wherein the threaded spindle includes a multiple-start thread.

5. The drive device according to claim 1, wherein the other nut pins are arranged in axial slots in the spindle nut and are free to move in the axial direction.

6. The drive device according to claim 1, wherein the threaded spindle has a smaller lead in a first area traversable by the spindle nut at a beginning of an outward-travel stroke than in a second area traversable by the spindle unit at an end of the outward-travel stroke.

7. The drive device according to claim 1, wherein the threaded spindle is supported rotatably at one end on the housing tube and held stationary in an axial direction with respect to the housing tube and is rotatably driveable by the rotary drive, and wherein the spindle nut, which is connected to the first fastening element, is prevented from rotating with respect to the housing tube.

8. The drive device according to claim 7, wherein the spindle nut is connected to one end of a spindle tube, which coaxially surrounds the threaded spindle, the first fastening element being permanently mounted on another end of the spindle tube.

9. The drive device according to claim 8, wherein a stroke position of the spindle tube is detectable by a stroke detection sensor.

10. The drive device according to claim 9, wherein the stroke detection sensor is a linear potentiometer, a wiper of which is permanently connected to the spindle tube or to the housing tube, a wiper track being permanently connected to one of the housing tube and spindle tube.

11. The drive device according to claim 8, further comprising:
a guide tube mounted in the housing tube, said guide tube surrounding the spindle tube and forming a predefined gap between the guide tube and the spindle tube.

12. The drive device according to claim 11, wherein the first fastening element is actuated by a compression spring supported on the housing tube; and wherein an helical compression spring surrounds the guide tube and forms a predefined gap between the helical compression spring and the guide tube, said helical compression spring being surrounded by a jacket tube with another predefined gap between the helical compression spring and the jacket tube which is connected to the first fastening element.

13. The drive device according to claim 12, wherein the housing tube and the jacket tube, inwardly and outwardly, slideably engage each other in a telescoping manner.

14. The drive device according to claim 11, wherein a wiper of a linear potentiometer is permanently connected to one of the spindle tube and the housing tube, a wiper being permanently connected to one of the housing tube and to the spindle tube, and wherein the guide tube has an axial slot which extends substantially through the guide tube in a radial direction, through which the wiper permanently connected to the spindle tube at least one of projects to the wiper track permanently connected to the guide tube and a radially oriented support pin of the spindle nut.

15. The drive device according claim 1, wherein the rotary drive is an electric motor, an output shaft of the electric motor being configured to rotatably drive the threaded spindle or a clutch component of a clutch.

16. The drive device according to claim 1, wherein the spindle drive is rotatably driveable by the rotary drive acting through a gearbox.

17. The drive device according to claim 16, wherein at least one of the rotary drive and the gearbox are mounted permanently in the housing tube.

18. The drive device according to claim 16, wherein the gearbox is one of a cylindrical gear system and a planetary gear set.

19. The drive device according to claim 16, wherein stages of the gearbox near the rotary drive are configured as helical gear stages.

20. The drive device according to claim 16, wherein the rotary drive, the gearbox, a clutch and the spindle drive are arranged in series.

21. The drive device according to claim 1, wherein the spindle drive is rotatably driveable by the rotary drive acting through a flexible shaft.

22. The drive device according to claim 1, wherein at least one of the fastening elements comprise ball heads or ball sockets of ball joints.

23. The drive device according to claim 1, wherein the first fastening element is or can be actuated by the force of a spring in an outward-travel direction away from the housing tube.

24. The drive device according to claim 23, wherein the first fastening element is actuated by a compression spring supported on the housing tube.

25. The drive device according to claim 24, wherein the compression spring is a helical compression spring.

26. The drive device according to claim 23, wherein the first fastening element is actuated by gas pressure.

27. The drive device according to claim 1, wherein revolutions of the spindle are detectable by a spindle sensor.

28. The drive device according to claim 1, wherein the spindle drive is rotatably driveable by the rotary drive acting through a releasable clutch.

29. The drive device according to claim 28, wherein the clutch is a positive clutch or a friction clutch.

30. The drive device according to one of claim 29, wherein the clutch is openable and closeable.

31. The drive device according to claim 30, wherein the clutch is magnetically engageable and disengageable.

32. The drive device according to claim 29, wherein the clutch is open when the drive device is not under load or is under load in an outward travel direction and is closeable when the drive device is under load in an inward travel direction.

* * * * *